Feb. 9, 1965   G. H. DYRDAHL   3,168,800
ADJUSTABLE SKID SHOE FOR SWATHERS AND THE LIKE
Filed Nov. 9, 1962   2 Sheets-Sheet 1

INVENTOR.
GORDEN H. DYRDAHL
BY
*Merchant, Merchant & Gould*
ATTORNEYS

Feb. 9, 1965    G. H. DYRDAHL    3,168,800
ADJUSTABLE SKID SHOE FOR SWATHERS AND THE LIKE
Filed Nov. 9, 1962    2 Sheets-Sheet 2
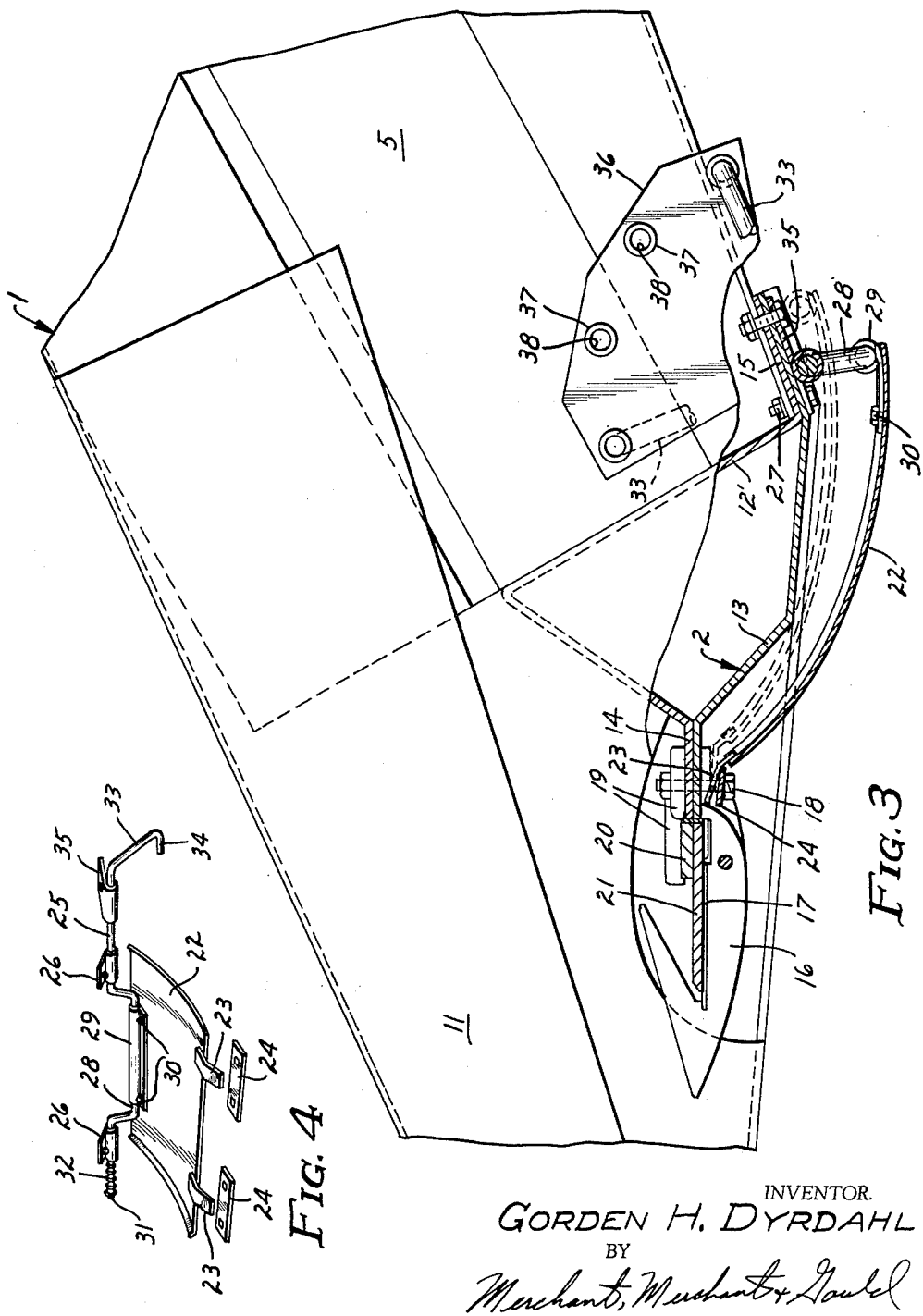
INVENTOR.
GORDEN H. DYRDAHL
BY
Merchant, Merchant & Gould
ATTORNEYS

3,168,800
ADJUSTABLE SKID SHOE FOR SWATHERS AND THE LIKE
Gorden H. Dyrdahl, Owatonna, Minn., assignor to Owatonna Manufacturing Company, Inc., Owatonna, Minn., a corporation of Minnesota
Filed Nov. 9, 1962, Ser. No. 236,533
6 Claims. (Cl. 56—210)

This invention relates generally to agricultural apparatus, and more particularly to attachments or improvements in mobile implements of the type using sickle mowers, such as swathers, windrowers and the like.

More specifically, this invention relates to skid shoes for such implements, and has for its primary object the provision of such skid shoes as will support the mower portion of an implement in predetermined upwardly spaced relation to the ground surface over which the implement travels, whereby to prevent the mower structure from engaging the underlying ground surface.

Another important object of this invention is the provision of skid shoes which can be quickly and easily adjusted to vary the minimum spacing between the mower and the ground.

Still another object of this invention is the provision of adjustable skid shoes as set forth which can be easily mounted on apparatus, such as windrowers and the like, without the use of special tools.

Another object of this invention is the provision of adjustable skid shoes which are positively held in the adjusted set positions thereof.

Another object of this invention is the provision of skid shoes of the type herein disclosed which are simple and inexpensive to produce, and which are rugged in construction and durable in use.

The above, and still further highly important objects and advantages of this invention will become apparent from the following detailed specification, appended claims and attached drawings.

Referring to the drawings, which illustrate the invention, and in which like reference characters indicate like parts throughout the several views:

FIG. 3 is a still further enlarged view in end elevation as seen from the right with respect to FIG. 1, some parts being broken away and some parts being shown in section; and FIG. 4 is a view in perspective of one of the skid shoes of my invention, and the mounting and adjusting means therefor.

Figure 1:
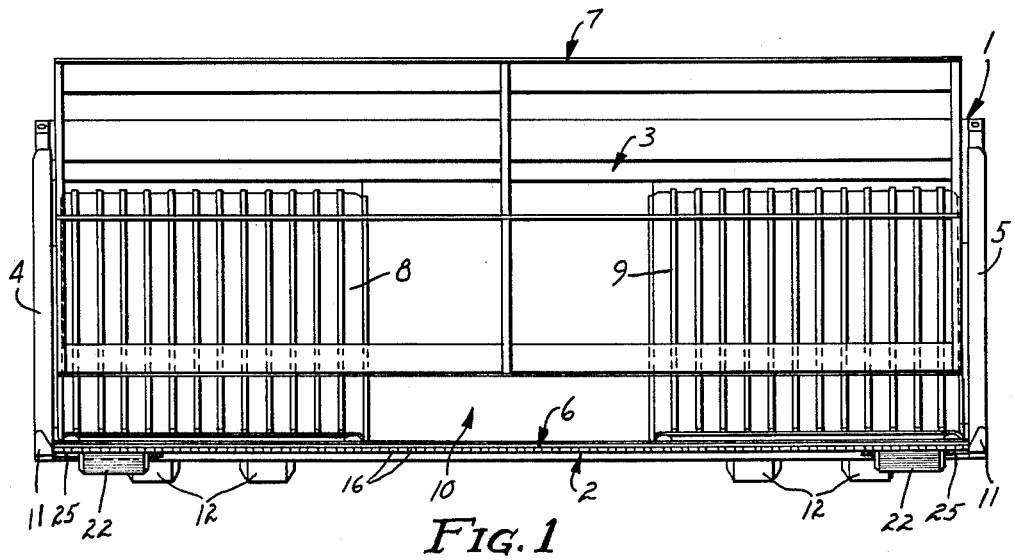
FIG. 1 is a fragmentary view in front elevation of a windrower with the adjustable skid shoes of my invention attached thereto.

Referring with greater detail to the drawings, a commercially available windrower is shown as comprising an upwardly and rearwardly sloping generally rectangular frame structure 1 having front and rear frame members 2 and 3 respectively and laterally spaced parallel side frame members 4 and 5. The windrower further involves a sickle bar mower 6, a reel 7, and a pair of laterally spaced rearwardly and upwardly sloping endless conveyor belts or aprons 8 and 9 that are driven in directions to deliver crops cut by the mower 6 to a central opening 10 through which the cut crop falls to the ground in a windrow. The side frame members 4 and 5 are provided with forwardly projecting gathering fingers or the like 11, the entire structure being supported by ground engaging wheels 12, shown fragmentarily in FIG. 1.

The above-described windrower structure is similar to that disclosed in United States Letters Patent No. 2,677,-225, issued May 4, 1954 to Julius Ommodt, reference being had thereto. Inasmuch as the above-described windrower structure, in and of itself, does not comprise the instant invention, further detailed showing and description thereof is believed unnecessary. Hence, in the interest of brevity, such detailed description is omitted.

With reference particularly to FIG. 3, it will be seen that the front frame member 2 is of elongated box section, involving a pair of formed bars 12' and 13 which cooperate to provide front and rear flanges 14 and 15 respectively, the rear flange 15 being rigidly secured to the lower front ends of the side frame members 4 and 5, the front flange 14 comprising a mower bar. A plurality of mower guards or fingers 16, equipped with the usual ledger plates 17, are rigidly secured to the mower bar or flange 14 by means of nut-equipped bolts or the like 18, in the usual manner. The bolts 18 extend through and anchor the usual clips 19 to the mower bar 14, the clips 19 forming guides for an elongated sickle bar 20 having the usual sickle knives or sections 21 rigidly secured thereto in face-to-face engagement with the underlying ledger plates 17. Reciprocatory movement is imparted to the sickle bar 20 and sections 21 carried thereby by suitable and well known means, not shown.

Figure 2:
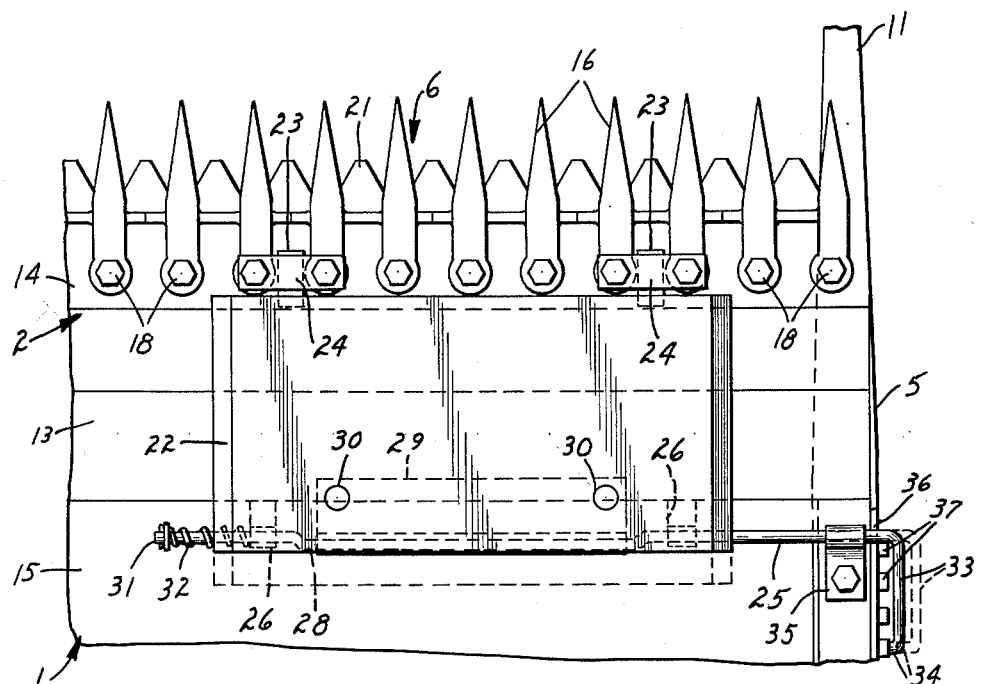
FIG. 2 is an enlarged fragmentary view in bottom plan of a portion of FIG. 1.

Machines of the above-described type are usually generally vertically movable to adjust the height of the mower structure from ground level, for the purpose of cutting the crop at levels which will harvest the desired length of stem. When a machine is operating with the mower in close proximity to the ground, and in fields where the terrain is somewhat rough or uneven, the guards 16 and sickle sections 21 often dig into the ground. This results in early dulling or otherwise damaging the cutting edges of the sickle sections 21 and undue wearing of the moving parts. For the purpose of maintaining the mower portion of the windrower at a predetermined or selected minimum level above ground surface, I provide a pair of skid shoe elements 22, and novel means for mounting the skid shoe elements to the mower structure and for adjustment of the same, now to be described. The skid shoe elements 22 are preferably disclosed each adjacent an opposite end of the front frame structure 1 in underlying relation to the front frame member 2 and mower bar 14, and are cross-sectionally curved from the front to the rear ends thereof. At their front ends, the skid shoe elements 22 are provided with laterally spaced forwardly projecting mounting tabs 23 which rest upon cooperating hanger bars 24 which straddle the rear ends of spaced pairs of the guards 16, and is downwardly spaced to the overlying mower bar 14, see FIGS. 2 and 3. The hanger bars 24 are anchored in place by the nut-equipped bolts 18 which mount the guards 16 to the mower bar or flange 14. As shown in FIG. 3, the ears 23 are loosely disposed between the hanger bars 24 and the overlying flange or mower bar 14 to permit limited upward and downward swinging movements of the skid shoe elements 22.

A pair of elongated shafts 25 are journalled in bearings 26 that are rigidly secured to the under surface of the rear flange 15 by nut-equipped bolts or the like 27 in spaced apart relationship longitudinally of the mower bar structure. Each of the shafts 25, intermediate its pair of bearings 26 is formed to provide a crank portion 28 that is journalled in a bearing 29 bolted or otherwise rigidly secured to the rear end portion of its respective skid shoe element 22, as indicated at 30. The shafts 25 are substantially identical, differing only in that one is left hand and the other is right hand. Further, each of the shafts 25 extends axially beyond its respective bearings 26, the inner end of the shaft 25 being provided with a head 31, between which end the adjacent bearing 26 is interposed a coil compression spring 32, the purpose of which will hereinafter become apparent. The opposite end portion of each shaft 25 is formed to provide a radially projecting arm 33 which terminates at its outer end in an inturned portion 34 disposed in spaced parallel relation to the axis of the shaft 25. Adjacent the radial arm 33 on each shaft 25 is a third bearing member 35 that is adapted to be bolted or otherwise rigidly secured to the adjacent side frame member 4 or 5.

Rigidly secured to the outer surfaces of the side frame members 4 and 5 are locking plates 36 each having a plurality of bosses 37 extending outwardly therefrom, said bosses 37 defining recesses 38 for reception of the inturned ends 34 of their adjacent radial arms 33. With reference to FIG. 3, it will be seen that the recesses 38 are disposed in circumferentially spaced relationship about an arc the center of which is coincident with the axis of the adjacent shaft 25. Thus, upon rotation of each shaft 35, the inturned end 34 of its respective radial arm moves into registration with any given one of the recesses 38. The springs 32 yieldingly urge their respective shafts 25 axially inwardly relative to the several bearings 26, 29 and 35, in which the shafts 25 are axially slidable as well as journalled, whereby to move the inturned ends 34 toward reception into the recesses 38 of their respective locking plates 36. Thus, as shown by full and dotted lines in FIGS. 2 and 3, the radial arms 33 may be manually moved axiallly outwardly and swung in directions about the axis of the shafts 25 to cause the skid shoe elements 22 to move between their full and dotted line positions of FIG. 3. When a selected elevation of the skid shoes 22 is made, the arm 33 is positioned with its inturned end 34 in registration with the closest adjacent recess 38, and then released, permitting the springs 32 to move said inturned ends 34 into the aligned recesses to positively lock the shoes 22 against movement upwardly or downwardly relative to the mower bar structure.

As shown, the hanger bars 24 are installed by utilizing the same bolts 18 that are normally used for attaching the guards 16, and the bearings 26 and 35 are bolted to the frame structure utilizing holes in the frame structure and nut equipped bolts already provided to hold the frame structure together. If, in some different windrowers such holes are not provided, it is a simple matter to drill the same.

My invention has been thoroughly tested and found to be completely satisfactory for the accomplishment of the objectives set forth; and while I have shown a commercial embodiment of my novel skid shoe element and mounting means therefor, it will be understood that the same is capable of modification without departure from the spirit and scope of the invention, as defined in the claims.

What I claim is:

1. An attachment for harvesting implements of the type involving, a frame adapted for movement over a field, and mower structure on the front end of said frame and including a mower bar fixedly mounted on the frame and a cooperating sickle bar, said attachment comprising;
    (a) a ground engaging shoe element adapted to underlie said frame,
    (b) means on the front end of said shoe element for mounting the same to said mower structure for generally vertical swinging movements of the shoe element toward and away from said frame,
    (c) crank means adapted to be connected to said frame and operatively coupled to the rear end portion of said shoe element for imparting said swinging movements to said shoe element,
    (d) and crank engaging means for releasably locking said shoe element in different desired positions of swinging movements thereof.

2. An attachment for harvesting implements of the type involving, a frame adapted for movement over a field, and mower structure on the front end of said frame and including a mower bar fixedly mounted on the frame and a cooperating sickle bar, said attachment comprising:
    (a) a ground-engaging shoe element adapted to underlie said frame,
    (b) means on the front end of said shoe element for mounting the same to said mower bar structure for generally vertical swinging movements of the shoe element toward and away from said frame,
    (c) a shaft having a crank portion,
    (d) means for journalling said shaft to said frame adjacent the rear end of said shoe,
    (e) means journalling said crank on said shoe at the rear end portion thereof, whereby to impart swinging movements to said shoe element,
    (f) and means for releasably locking said shoe element in different desired positions of swinging movements thereof.

3. The structure defined in claim 2 in which said means for releasably locking said shoe element in said positions of movement thereof comprises;
    (a) a radial arm on said crank shaft,
    (b) and means defining a plurality of circumferentially spaced recesses for selective reception of a portion of said radial arm radially outwardly of said shaft.

4. In a harvesting implement comprising a frame adapted for movement over a field and mower structure on the front end of said frame and including a mower bar fixedly mounted on the frame and a cooperating sickle bar;
    (a) a ground engaging shoe element underlying the front portion of said frame,
    (b) means loosely supporting the front end portion of said shoe element from said mower bar for generally vertical swinging movements of said shoe element toward and away from said frame,
    (c) a shaft journalled to said frame adjacent the rear end of said shoe element and having a crank portion journalled on the rear end portion of said shoe element,
    (d) a radial arm on one end of said shaft and disposed alongside of an adjacent end of said frame,
    (e) and means on said frame for engaging said radial arm at circumferentially spaced points of common movement thereof with said shaft to releasably lock said shaft in different positions of rotary movement thereof.

5. The structure defined in claim 4 in which said last mentioned means comprises an anchoring member defining a plurality of recesses spaced circumferentially on an arc having a common axis with said shaft, said arm having an inturned outer end receivable in said recesses selectively, said shaft being axially movable relative to said frame to permit insertion of said inturned end into said recesses and withdrawal therefrom, and in further combination with yielding means urging said shaft and arm in a direction to move said inturned end toward reception thereof in said recesses.

6. An attachment for harvesting implements of the type involving, a frame adapted for movement over a field, and mower structure on the front end of said frame and including a mower bar and a cooperating sickle bar, said attachment comprising:
    (a) a ground-engaging shoe element adapted to underlie said frame,
    (b) means for mounting said shoe element for generally vertical swinging movements of the shoe element toward and away from said frame, and comprising a pair of laterally spaced tabs projecting forwardly from the front end of said shoe, and a pair of hanger elements adapted to be secured to the bottom portion of said mower bar and having tab-supporting surfaces downwardly spaced from the mower bar when said hanger elements are secured thereto to permit free sliding and swinging movements of said tabs on respective ones of said supporting surfaces,
(c) means adapted to be connected to said frame and operatively coupled to the rear end portion of said shoe element for imparting said swinging movements to said shoe element,
(d) and means for releasably locking said shoe element in different desired positions of swinging movements thereof.

References Cited in the file of this patent
UNITED STATES PATENTS

| | | |
|---|---|---|
| 2,875,568 | Watamaker | Mar. 3, 1959 |
| 2,971,316 | Popandopulo | Feb. 14, 1961 |
| 3,021,660 | Huseman | Feb. 20, 1962 |